United States Patent
Hoydis et al.

(10) Patent No.: US 11,870,530 B2
(45) Date of Patent: Jan. 9, 2024

(54) BEAM ALIGNMENT

(71) Applicant: Nokia Technologies Oy, Espoo (FI)

(72) Inventors: Jakob Hoydis, Paris (FR); Luca Rose, Orsay (FR)

(73) Assignee: Nokia Technologies Oy, Espoo (FI)

( * ) Notice: Subject to any disclaimer, the term of this patent is extended or adjusted under 35 U.S.C. 154(b) by 423 days.

(21) Appl. No.: 17/279,361

(22) PCT Filed: Sep. 28, 2018

(86) PCT No.: PCT/EP2018/076448
§ 371 (c)(1),
(2) Date: Mar. 24, 2021

(87) PCT Pub. No.: WO2020/064123
PCT Pub. Date: Apr. 2, 2020

(65) Prior Publication Data
US 2021/0391911 A1   Dec. 16, 2021

(51) Int. Cl.
*H04W 72/044* (2023.01)
*H04B 7/06* (2006.01)
*H04B 7/08* (2006.01)

(52) U.S. Cl.
CPC ........... *H04B 7/0695* (2013.01); *H04B 7/088* (2013.01); *H04W 72/046* (2013.01)

(58) Field of Classification Search
None
See application file for complete search history.

(56) References Cited

U.S. PATENT DOCUMENTS 9,253,592 B1     2/2016   Moscovich et al. .......... 342/354
2015/0358055 A1 12/2015  Molisch et al.
(Continued)

FOREIGN PATENT DOCUMENTS

CN    106537808 A    3/2017
CN    108-292944 A   7/2018
(Continued)

OTHER PUBLICATIONS

Giodani et al., "Standalone and Non-Standalone Beam Management for 3GPP NR at mmWaves", arXiv, May 11, 2018, pp. 1-7.
(Continued)

*Primary Examiner* — Anh Vu H Ly
(74) *Attorney, Agent, or Firm* — Harrington & Smith

(57) ABSTRACT

A method, apparatus and computer program is described, comprising: obtaining a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

13 Claims, 6 Drawing Sheets

(56) References Cited

U.S. PATENT DOCUMENTS

| | | | |
|---|---|---|---|
| 2017/0331544 A1 | 11/2017 | Athley et al. | |
| 2019/0238202 A1* | 8/2019 | Chavva | H04B 7/0617 |
| 2019/0253117 A1* | 8/2019 | Raghavan | H04B 7/0623 |

FOREIGN PATENT DOCUMENTS

| | | | | |
|---|---|---|---|---|
| CN | 108306662 A | | 7/2018 | |
| KR | 20180080122 A | | 7/2018 | |
| WO | 2017/132629 A1 | | 8/2017 | |
| WO | 2018/174769 A1 | | 9/2018 | |
| WO | WO-2019190368 A1 | * | 10/2019 | |
| WO | WO-2020005121 A1 | * | 1/2020 | H04B 7/0695 |
| WO | WO-2020005296 A1 | * | 1/2020 | H04B 7/0695 |
| WO | WO-2020036521 A1 | * | 2/2020 | G06N 20/00 |

OTHER PUBLICATIONS

Wang et al., "MmWave Beam Prediction with Situational Awareness: a Machine Learning Approach", arXiv, May 23, 2018, 5 pages.

Klautau et al., "5G MIMO Data for Machine Learning: Application to Beam-selection Using Deep Learning", Conference: 2018 Information Theory and Applications Workshop (ITA), Feb. 2018, 9 pages.

Ekman, "Machine Learning for Beam Based Mobility Optimization in NR", Thesis, 2017, 85 pages.

International Search Report and Written Opinion received for corresponding Patent Cooperation Treaty Application No. PCT/EP2018/076448, dated Jun. 3, 2019, 14 pages.

Chen et al., "Learning-assisted Beam Search for Indoor mmWave Networks", IEEE Wireless Communications and Networking Conference Workshops (WCNCW), Apr. 15-18, 2018, pp. 320-325.

Xiao et al., "Millimeter Wave Communications for Future Mobile Networks", IEEE Journal on Selected Areas in Communications, vol. 35, No. 9, Sep. 2017, pp. 1909-1935.

Office Action received for corresponding European Patent Application No. 18782019.6, dated May 12, 2023, 5 pages.

Haisheng, Zhang, et al., "An Approach of Subarray Digital Beamforming Based on Improved Genetic Algorithm", Journal of Telemetry, Tracking and Command, vol. 37, No. 4, Jul. 2016, 6 pages.

* cited by examiner

BEAM ALIGNMENT

RELATED APPLICATION

This application was originally filed as PCT Application No. PCT/EP2018/076448, filed on Sep. 28, 2018 of which is incorporated herein by reference in its entirety.

FIELD

This specification relates to beam alignment, for example for communication between a user device and a base station.

BACKGROUND

Users devices may comprise a number of beams that can be used for communications with base stations. Similarly, a base station may comprise a number of beams that can be used for communications with user devices. There remains a need for developments relating to the selection of beam pair combinations for communications between user devices and base stations.

SUMMARY

In a first aspect, this specification describes an apparatus comprising: means for obtaining a first beam alignment dataset, wherein the first beam alignment dataset comprises measurement data (such as received signal strength) for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and means for selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset. Many machine-learning models could be used for implementing the concepts described herein. These include neural network, support vector machines, k-nearest neighbours algorithms, look-up tables etc. The machine-learning model may receive the first beam alignment dataset at an input. The machine-learning model may provide the first beam pair combination at an output.

The first beam pair combination selected for communications between the first user device and the base station may or may not be one of the beam pairs of the first beam alignment dataset. Thus, beam pair combinations outside the first plurality of beam pair transmissions may be available for selection.

The first and/or second beam alignment dataset may be generated by beam sweeping.

The first beam pair combination may be selected based on a determination of a deemed strongest communication channel between the first user device and the base station. The deemed strongest communication channel may be based on a metric, such as received signal strength.

The second beam alignment dataset may comprise measurement data for a second plurality of beam pair transmissions, wherein each beam pair transmission of the second plurality is between one of the plurality of communication beams of the first user device and one of the plurality of communication beams of the base station.

The first plurality of beam pair transmissions may be a subset of the second plurality of beam pair transmissions. The first plurality of beam pair transmissions may be a predefined subset of the second plurality of beam pair transmissions. Other arrangements (other than a predefined subset) are possible, such as a random (or pseudorandom) subset.

The second plurality of beam pair transmissions may include all available beam pair transmissions between the first user device and the base station. Thus, the second plurality of beam pair transmissions may be exhaustive.

The first beam alignment dataset may comprise a broad alignment dataset and a narrow alignment dataset and the means for selecting a first beam pair combination comprises means for selecting a broad beam pair combination and means for selecting a narrow beam pair combination. The broad alignment dataset may comprise measurement data for a first plurality of broad beams and the narrow alignment dataset may comprise measurement data for a first plurality of narrow beams from within a selected broad beam pair combination. One or both of the broad and narrow alignment datasets may be subsets of all available beam pair transmissions.

Some embodiments may comprise means for determining the first plurality of beam pair transmissions (for example using generic/evolutionary algorithms, reinforcement learning, exhaustive search etc.) Alternatively, or in addition, the set of possible beams from which the first plurality of beam pair transmissions are selected may be learned through an algorithm.

The means for selecting the first beam pair combination may select said first beam pair combination, at least in part, based on one or more previous first beam alignment datasets (for example, by averaging over multiple readings).

Some embodiments may further comprise: means for determining a communication performance of the first beam pair combination and/or an accuracy of the machine learning module; and means for re-training the machine learning module in the event that the communication performance and/or the accuracy is below a threshold performance.

The first beam alignment dataset may be obtained by the first user device sending a plurality of reference signals (e.g. pilot signals) to the base station and/or the base station sending a plurality of reference signals (e.g. pilot signals) to the first user device. The second beam alignment dataset may be obtained by the first user device sending a plurality of reference signals (e.g. pilot signals) to the base station and/or the base station sending a plurality of reference signals (e.g. pilot signals) to the first user device.

The means may comprise: at least one processor; and at least one memory including computer program code, the at least one memory and the computer program code configured, with the at least one processor, to cause the performance of the apparatus.

In a second aspect, this specification describes a method comprising: obtaining a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

The first beam pair combination selected for communications between the first user device and the base station may or may not be one of the beam pairs of the first beam alignment dataset. Thus, beam pair combinations outside the first plurality of beam pair transmissions may be available for selection.

The first beam pair combination may selected based on a determination of a deemed strongest communication channel between the first user device and the base station. The deemed strongest communication channel may be based on a metric, such as received signal strength.

The second beam alignment dataset may comprise measurement data for a second plurality of beam pair transmissions, wherein each beam pair transmission of the second plurality is between one of the plurality of communication beams of the first user device and one of the plurality of communication beams of the base station.

The first plurality of beam pair transmissions may be a subset of the second plurality of beam pair transmissions. The first plurality of beam pair transmissions may be a predefined subset of the second plurality of beam pair transmissions. Other arrangement (other than a predefined subset) are possible, such as a random (or pseudorandom) subset.

The second plurality of beam pair transmissions may include all available beam pair transmissions between the first user device and the base station. Thus, the second plurality of beam pair transmissions may be exhaustive.

The first beam alignment dataset may comprise a broad alignment dataset and a narrow alignment dataset and the means for selecting a first beam pair combination comprises means for selecting a broad beam pair combination and means for selecting a narrow beam pair combination. The broad alignment dataset may comprise measurement data for a first plurality of broad beams and the narrow alignment dataset may comprise measurement data for a first plurality of narrow beams from within a selected broad beam pair combination. One or both of the broad and narrow alignment datasets may be subsets of all available beam pair transmissions.

Some embodiments may comprise means for determining the first plurality of beam pair transmissions (for example using generic/evolutionary algorithms, reinforcement learning, exhaustive search etc.) Alternatively, or in addition, the set of possible beams from which the first plurality of beam pair transmissions are selected may be learned through an algorithm.

The first beam pair combination may be selected, at least in part, based on one or more previous first beam alignment datasets (for example, by averaging over multiple readings).

The machine learning module may be retrained in the event that a communication performance of the first beam pair combination and/or an accuracy of the machine learning module is below a threshold performance.

The first beam alignment dataset may be obtained by the first user device sending a plurality of reference signals (e.g. pilot signals) to the base station and/or the base station sending a plurality of reference signals (e.g. pilot signals) to the first user device. The second beam alignment dataset may be obtained by the first user device sending a plurality of reference signals (e.g. pilot signals) to the base station and/or the base station sending a plurality of reference signals (e.g. pilot signals) to the first user device.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: obtaining a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

In a sixth aspect, this specification describes a computer-readable medium (such as a non-transitory computer readable medium) comprising program instructions stored thereon for performing at least the following: obtaining a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

In a seventh aspect, this specification describes an apparatus comprising: at least one processor; and at least one memory including computer program code which, when executed by the at least one processor, causes the apparatus to: obtain a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and select a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

In an eighth aspect, this specification describes an apparatus comprising: a first input for obtaining a first beam alignment dataset, wherein the first beam alignment dataset comprises measurement data for a first plurality of beam pair transmissions, wherein each beam pair transmission of the first plurality is between one of a plurality of communication beams of a first user device and one of a plurality of communication beams of a base station and wherein the first plurality of beam pair transmissions is a subset of all available beam pair transmissions between the first user device and the base station; and a first module (e.g. a machine-learning module) for selecting a first beam pair combination for communications between the first user device and the base station, wherein the first beam pair combination comprises one of the plurality of beams of the first user device and one of the plurality of beams of the base station, wherein the means for selecting the first beam pair combination comprises a machine-learning model trained with a second beam alignment dataset.

BRIEF DESCRIPTION OF THE DRAWINGS

Example embodiments will now be described, by way of non-limiting examples, with reference to the following schematic drawings.

DETAILED DESCRIPTION

Figure 1:
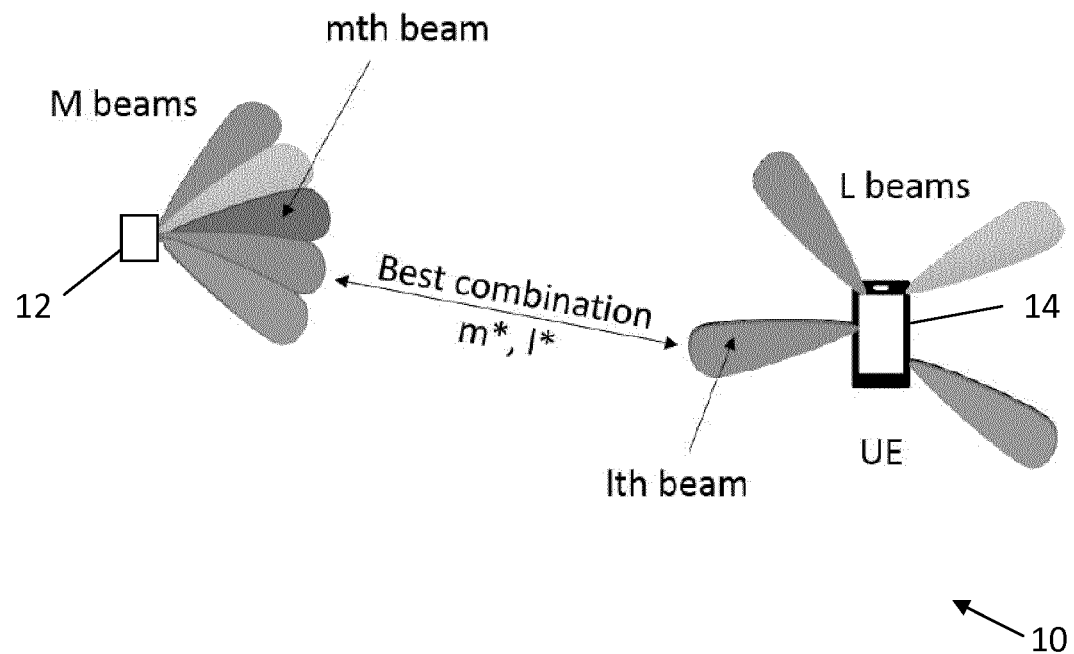
FIG. 1 is a block diagram of a system in accordance with an example embodiment.

In the description, like reference numerals relate to like elements throughout.

FIG. 1 is a block diagram of a system, indicated generally by the reference numeral 10, in accordance with an example embodiment. The system 10 comprises a base station 12 (or eNB, gNodeB, gNB) and a user device 14.

As shown in FIG. 1, the base station 12 and the user device 14 are each equipped with antenna arrays that can be configured according to beam codebooks of size M and L respectively. The base station and user device antenna arrays have $N_{gNB}$ and $N_{UE}$ radiating elements, respectively.

Thus, the base station 12 includes M beams and the user device 14 includes L beams (some of which beams are shown in FIG. 1). The system 10 can therefore be used to implement a grid-of-beams type communication between the base station and one or more user devices. In one example implementation, the base station 12 and the user device 14 communicate using radio frequencies in the mm-wave band (of the order of 30 to 300 gigahertz). However, other frequency ranges (e.g. lower frequencies) may be used.

The goal of beam alignment is to determine which of the M×L possible beam combinations leads to the strongest communication channel (according to some metric, such as received signal strength, although alternative metrics could be used). To this end, a beam sweeping algorithm may be used in which the user device 14 may transmit M reference signals (e.g. pilot signals) with one of its beams, while the base station 12 sweeps through its M beams (or vice-versa). This procedure may then be repeated for all other user device beams. After these M×L transmissions, the base station (or the user device) may determine which of the beam combinations leads to the strongest signal (denoted in FIG. 1 by m*,l*, as discussed further below), which can then be used for communications between the user device and the base station.

The observations $y_{m,l}$ corresponding to the m-th base station beam and the l-th user device beam are given as:

$$y_{m,l} = w_m^H H v_l x + n_{m,l}, 1 \leq m \leq M, 1 \leq l \leq L \quad (1)$$

where:

$w_m \in \mathbb{C}^{N_{gNB}}$ is the m-th beamforming vector of the base station 12;

$v_l \in \mathbb{C}^{N_{UE}}$ is the l-th beamforming vector of the user device 14;

x is a pilot (or reference) signal transmitted by the user device 14;

$H \in \mathbb{C}^{N_{gNB} \times N_{gUE}}$ is a channel matrix; and $n_{m,l}$ is receiver noise.

After the observations $y_{m,l}$ for all m, l have been collected, the base station 12 computes the optimal beamformers according to:

$$(m^*, l^*) = \arg \max_{m,l} |y_{m,l}|^2 \quad (2)$$

Note that other metrics could be used to compute (m*,l*).

For later use, we define the matrix $Y \in \mathbb{C}^{M \times L}$ with $[Y]_{m,l} = y_{m,l}$, which simply collects all observations.

The base station 12 records and stores many such observations $Y^{(i)}$ and the corresponding optimal beamformers $m^*_{(i)}, l^*_{(i)}$, for i=1, . . . , B. One can think of each $Y^{(i)}$ as the observation made for a different user device position, but also other effects, such as interference or moving scatters, might be relevant. This constitutes the dataset below, which will be used to train a machine learning model (as discussed further below):

$$\mathcal{D} = \{(Y^{(1)}, m^*_{(1)}, l^*_{(1)}), \ldots, (Y^{(B)}, m^*_{(B)}, l^*_{(B)})\} \quad (3)$$

Figure 2:
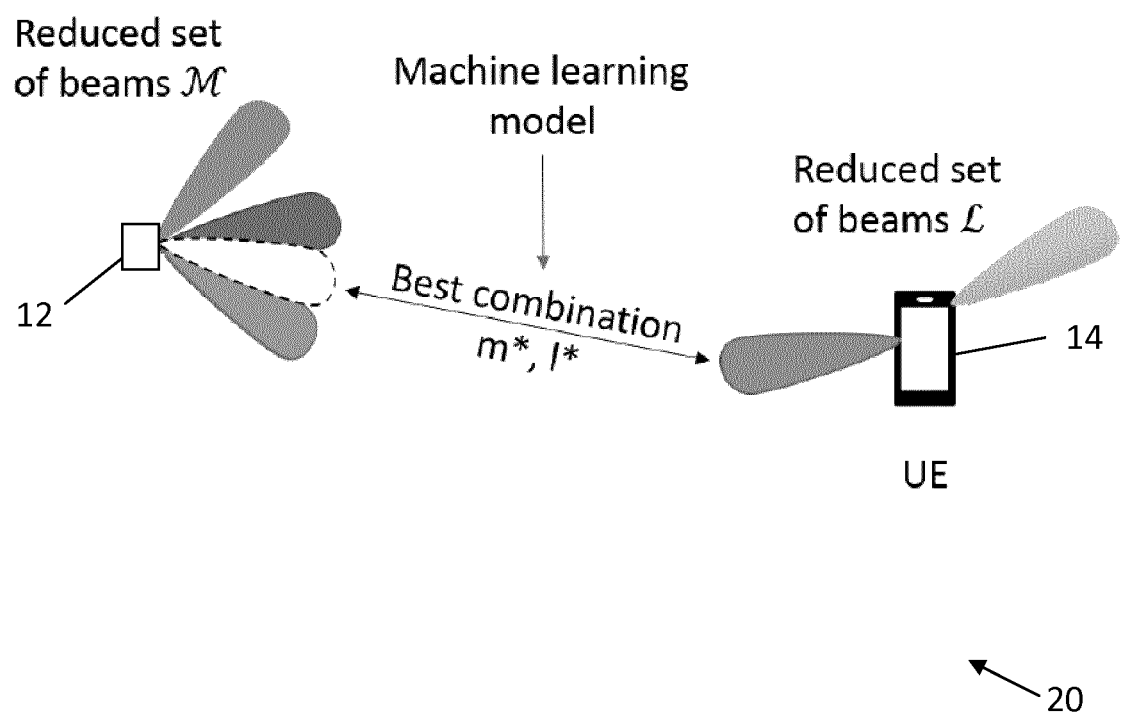
FIG. 2 is a block diagram of a system in accordance with an example embodiment.

FIG. 2 is a block diagram of a system, indicated generally by the reference numeral 20, in accordance with an example embodiment. The system 20 comprises the base station 12 and the user device 14.

As discussed above with reference to FIG. 1, the base station 12 and the user device 14 are each equipped with antenna arrays that can be configured according to beam codebooks of size M and L respectively. As discussed above, the base station and user device antenna arrays have $N_{gNB}$ and $N_{UE}$ radiating elements, respectively.

A goal of the use of the system 20 is to predict optimal beamformers m*, l* from a subset of observations $y_{m,l}$. As discussed further below, one benefit of the algorithms described herein is that the number of possible beam combinations which need to be tested during beam alignment, as shown in the system 20, can be reduced from M×L to $|\mathcal{M}| \times |\mathcal{L}|$, where $\mathcal{M}$ and $\mathcal{L}$ are reduced sets of beams. Moreover, as indicated in FIG. 2, in at least some embodiments, it is not necessary for the optimal beamformers m*, l* to be part of the subset of observations.

Figure 3:
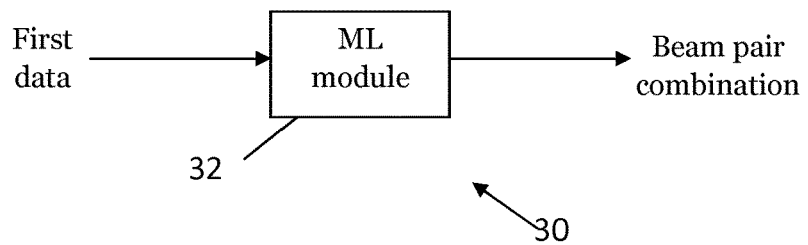
FIG. 3 shows a machine-learning module being used in accordance with an example embodiment.

FIG. 3 shows a system, indicated generally by the reference numeral 30, in accordance with an example embodiment. In the system 30, a machine-learning module 32 is used to receive first data at an input and to provide a beam pair combination at an output. A number of different technologies may be used for implementing the machine-learning module 32. These include neural network, support vector machine, k-nearest neighbour and look-up-table technologies.

A goal of the machine learning module 32 is to predict the optimal beamformers m*, l* from a subset of the observations $y_{m,l}$. To this end, we denote $\mathcal{M} \in [1, \ldots, M]$ and $\mathcal{L} \in [1, \ldots, L]$, and let $\tilde{Y}$ be the matrix constructed from taking the rows and columns of Y indexed by $\mathcal{M}$ and $\mathcal{L}$, respectively. In other words, $\tilde{Y}$ only contains observations from base station beamformers taken from $\mathcal{M}$ and user device beamformers taken from $\mathcal{L}$.

Figure 4:
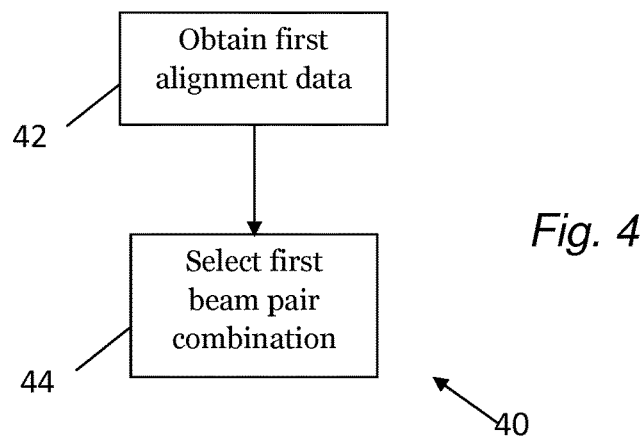
FIG. 4 is a flow chart showing an algorithm in accordance with an example embodiment.

FIG. 4 is a flow chart showing an algorithm, indicated generally by the reference numeral 40, in accordance with an example embodiment. The algorithm 40 shows an example use of the system 30. At operation 42, first alignment data is received (such as the alignment data discussed above with reference to FIG. 2). Next, at operation 44, a first beam pair combination is selected (such as the combination m*, l* discussed above with reference to FIG. 2). As discussed above, the first alignment data received in the operation 42 is a subset of the set of observations $y_{m,l}$.

Figure 5:
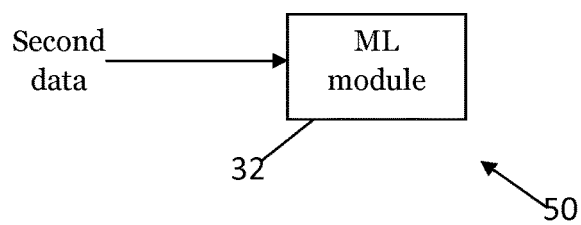
FIG. 5 shows a machine-learning module being trained in accordance with an example embodiment.

FIG. 5 shows a system, indicated generally by the reference numeral 50, in accordance with an example embodiment. In the system 50, the machine-learning module 32 described above is trained using second data received at an input. The second data may comprise alignment data as well as labels (e.g. optimal beam indices).

Figure 6:
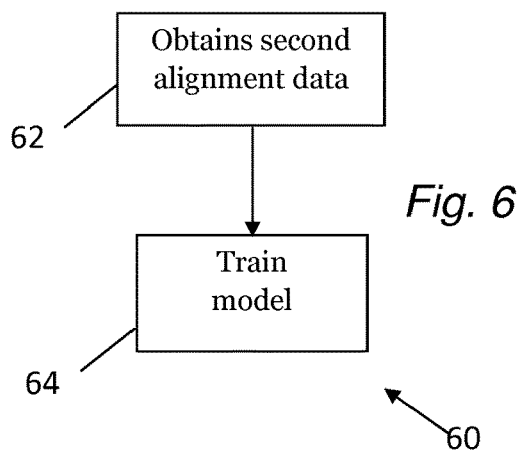
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 shows an example use of the system 50. At operation 62, second alignment data is received (such as the alignment data discussed above with reference to FIG. 1). Next, at operation 64, the machine learning model 32 is trained.

As noted above, a goal of the machine learning module 32 is to predict the optimal beamformers m*, l* from a subset of the observations $y_{m,l}$. To this end, we denote $\mathcal{M} \in [1, \ldots, M]$ and $\mathcal{L} \in [1, \ldots, L]$, and let $\tilde{Y}$ be the matrix constructed from taking the rows and columns of Y indexed by $\mathcal{M}$ and $\mathcal{L}$, respectively. In other words, $\tilde{Y}$ only contains observations from base station beamformers taken from $\mathcal{M}$ and user device beamformers taken from $\mathcal{L}$.

The machine-learning module 32 can then be trained to predict $m^*_{(i)}$, $l^*_i$ from $\widetilde{Y^{(i)}}$. A single model may be used to predict $m^*_{(i)}$, $l^*_{(i)}$ jointly. Alternatively, two models may be trained to predict $m^*_{(i)}$ and $l^*_{(i)}$ separately.

Since the machine learning module implements a classification task, categorical cross-entropy is a suitable loss function. The machine learning model could also be used to predict other metrics (e.g. SINR or throughput), which may then be used as a proxy to select the best beam pairs.

If the machine learning model(s) achieve(s) a certain prediction accuracy, the beam training procedure can be adapted such that the base station and user device only use the beams from $\mathcal{M}$ to $\mathcal{L}$, respectively. To this end, the base station may inform the user device 14 via a message about the transmit beams to be used (i.e. the set $\mathcal{L}$) and how many pilots should be transmitted via each beam (i.e. $|\mathcal{M}|$). The message could be communicated in a different way. Alternatively, the user device 14 could send such a message to the base station 12.

One benefit of the algorithms described herein is that the number of possible beam combinations which need to be tested during beam alignment can be reduced from M×L to $|\mathcal{M}| \times |\mathcal{L}|$. This may result in one or more of reduced overheads, shorter beam alignment time and higher data rates.

Figure 7A:
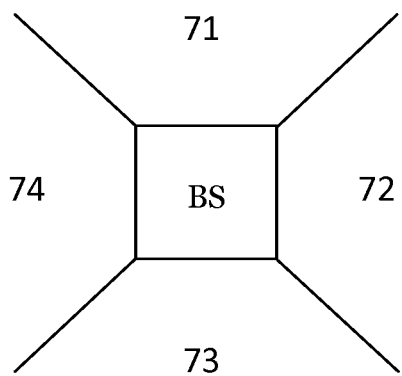
FIGS. 7A and 7B shows block diagrams of systems in accordance with example embodiments.
Figure 7B:
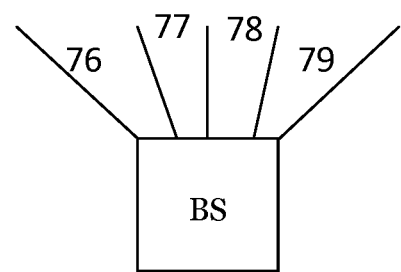

FIG. 7A shows a block diagram of a system, indicated generally by the reference numeral 70, in accordance with an example embodiment. The system 70 comprises a base station (similar to the base station 12 described above) having four broad beams (labelled 71 to 74) for communications. Each of the broad beams has a plurality of narrower sub-beams for communications with user devices. FIG. 7B shows a block diagram of a system, indicated generally by the reference numeral 75, in accordance with an example embodiment. The system 75 shows sub-beams 76 to 79 of one of the broad beams of the system 70 (the beam 71 in this example).

Figure 8:
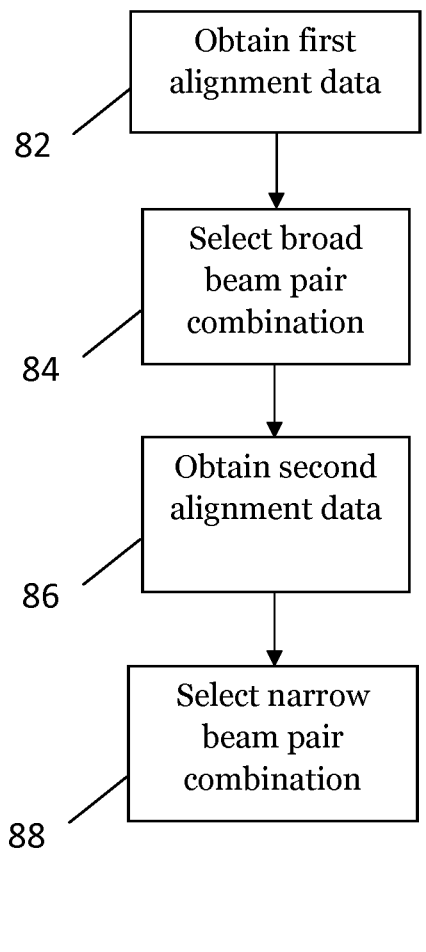
FIG. 8 is a flow chart showing an algorithm in accordance with an example embodiment.

FIG. 8 is a flow chart showing an algorithm, indicated generally by the reference numeral 80, in accordance with an example embodiment.

The algorithm 80 starts at operation 82 where first alignment data is received. As discussed above, the first alignment data comprises measurement data for a plurality of beam pair transmissions, wherein each beam pair transmission is between one of the plurality of the beams 71 to 74 and one of a plurality of beams of a first user device with which the base station is communicating. In a similar manner to the algorithm 40 described above, the plurality of beam pair transmissions may be a subset of all available beam pair transmissions (e.g. not all of the plurality of beams 71 to 74 need be included in the beam pair transmissions).

Next, at operation 84, a broad beam pair combination is selected (e.g. in order to provide the strongest communication channel between the base station and the respective user device). As discussed above, the selected beam pair combination need not necessarily be one of the beam pair combinations used in operation 82.

At operation 86, second alignment data is received. The second alignment data comprises measurement data for a plurality of sub-beam pair transmissions within the selected broad beam pair combination. Thus, in the event that the first broad beam 71 is selected in the operation 84, each beam pair transmission of the second alignment data may be between one of the plurality of sub-beams 76 to 79 shown in FIG. 7B and one of a plurality of beams of the respective user device with which the base station is communicating. In a similar manner to the operation 82 described above, the plurality of sub-beam pair transmissions may be a subset of all available beam pair transmissions (e.g. not all of the plurality of beams 76 to 79 need be included in the beam pair transmissions).

Next, at operation 88, a narrow beam pair combination is selected (e.g. in order to provide the strongest communication channel between the base station and the respective user device). As discussed above, the selected beam pair combination need not necessarily be one of the beam pair combinations used in operation 86.

Thus, the algorithm 80 provides a hierarchical beam search procedure consisting of at least two phases. In the first phase, a base station and a user device use codebooks with only a few broad beams. Once a good combination of broad beams is found, a second phase of beam refinement is carried out. Here, depending on the selected beams in the first phase, the base station and user device search through a second set of narrower beams. The algorithm 80 describes above uses a subset of beams in both the first and second phases of the hierarchical search procedure. This is not essential to all embodiments: the subset of beams could be used in one, but not both, of the phases.

The algorithm 80 shows a hierarchical beam search procedure includes two hierarchical levels by way of example only. Hierarchical procedures in accordance with the principles describes herein could include two, three or more hierarchical levels. Again, the subset of beams concept could be used in one, two or more (e.g. all) of the hierarchical levels.

The embodiments described above include a single base station communicating with a single user device. The concepts described herein can be extended to systems in which multiple user devices are communicating with a base station. The concepts can also be extended to system in which multiple base stations jointly server multiple user devices.

Figure 9:
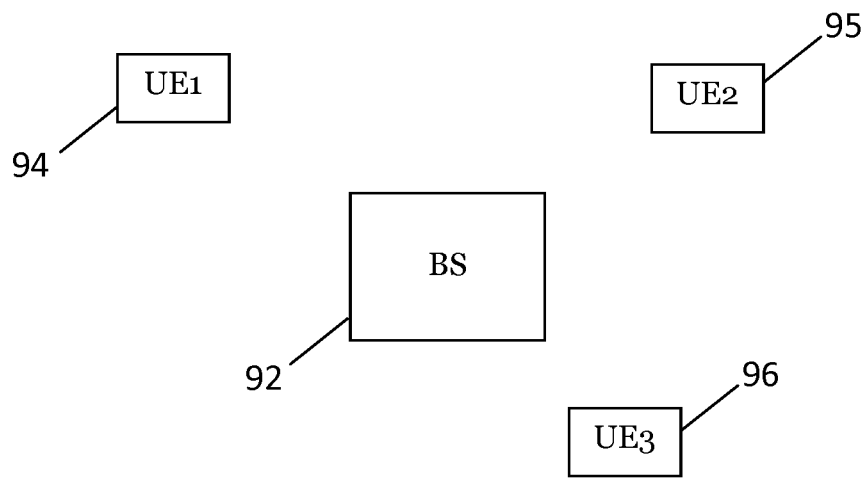
FIG. 9 is a block diagram of a system in accordance with an example embodiment.

FIG. 9 is a block diagram of a system, indicated generally by the reference numeral 90, in accordance with an example embodiment. The system comprises a base station 92, a first user device 94, a second user device 95 and a third user device 96.

In the system 90, the algorithms described above may need to modified to compute optimal beamformers for each user device-base station pair.

A possible implementation is as follows. Assume multiple users (e.g. $k_1$, $k_2$) are served at the same time in a spatial multiplexing scenario (such as the system 90). The metric (2) may be applied as follows:

$$(m^*_{k_1}, l^*_{k_1}, m^*_{k_2}, l^*_{k_2}) = \arg\max_{m_1 l_1 m_2 l_2} \alpha_1 \Sigma_k \alpha_k SINR_k \quad (4)$$

Where the values α can be set to opportunely tune the level of quality-of-server (QoS) per user device. The values $SINR_k$ can be estimated in various way, such as feedback from the user devices, scalar product of precoding vectors, etc.

Figure 10:
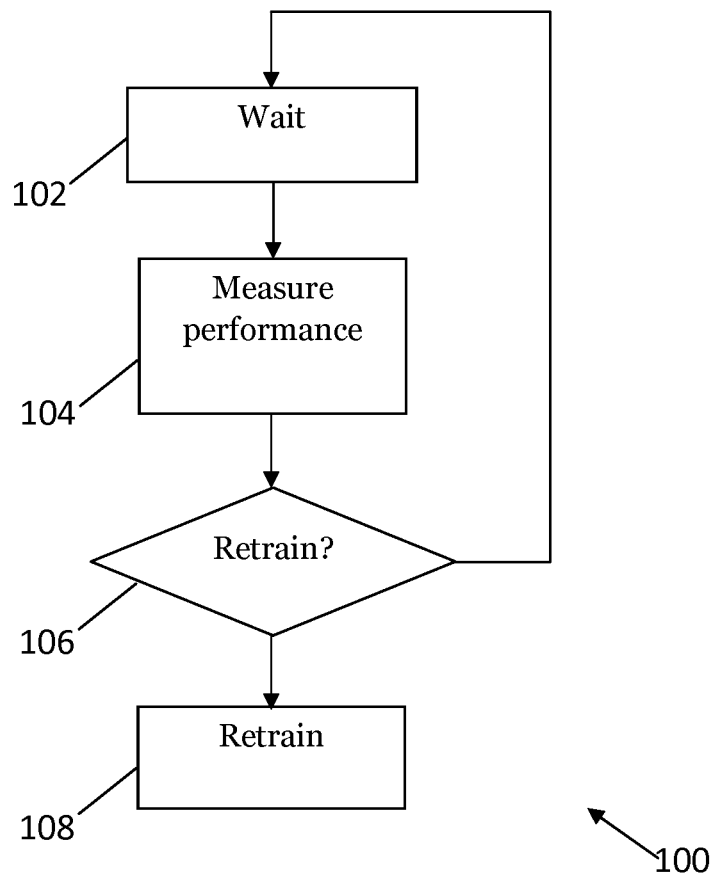
FIG. 10 is a flow chart showing an algorithm in accordance with an example embodiment.

FIG. 10 is a flow chart showing an algorithm, indicated generally by the reference numeral 100, in accordance with an example embodiment. The algorithm 100 starts at operation 102, in a wait state.

At operation 104, a communication performance of a first beam pair combination and/or the accuracy of the machine learning module is determined. At operation 106, it is determined (on the basis of the determined communication performance) whether retraining of the machine learning module is required. If so, at operation 108, the machine learning module is retrained. Retraining may occur, for example, if the communication performance and/or accuracy (e.g. of the first beam pair combination) is below a threshold performance. If it is determined in operation 106 that retrained is not required, then the algorithm 100 returns to operation 102.

The algorithm 100 may be used to retrain the machine learning modules in the event that performance drops. To this end, a full beam search may be executed from time-to-time and the obtained beams (based on the exhaustive search) compared against the predictions.

The embodiments described above are provided by way of example only. Many variants are possible, some of which are described below.

The embodiments described above generally include one or more user devices transmitting and a base station receiving. This is not essential to all embodiments. For example, the base station may transmit, with the one or more user devices receiving.

The relevant performance metric (such as the metric $|y_{m,t}|$ the equation (2) described above) may be averaged over multiple observations, such that the metric (2) becomes, for example:

$$(m^*, l^*) = \arg\max_{m,l} \frac{1}{T} \sum_{t=1}^{T} |y_{m,l,t}|^2 \quad (2)$$

Rather than predicting the optimal beamformers at a time instance t from current observation $\tilde{Y}(t)$ alone, it is possible to base the prediction on a sequence of observations $\tilde{Y}(t)$, $\tilde{Y}(t-1)$, $\tilde{Y}(t-2)$, . . . . Since the optimal beams are correlated over time (since a user device has finite speed), further gains can be expected and it may be possible to further reduce the number of required beams in $\mathcal{M}$ and $\mathcal{L}$.

The chosen sets $\mathcal{M}$ and $\mathcal{L}$ may heavily influence the prediction performance and the selection of the sets $\mathcal{M}$ and $\mathcal{L}$ can be optimised using various algorithms, such as genetic/evolutionary algorithms, reinforcement learning, exhaustive search etc.

Figure 11:
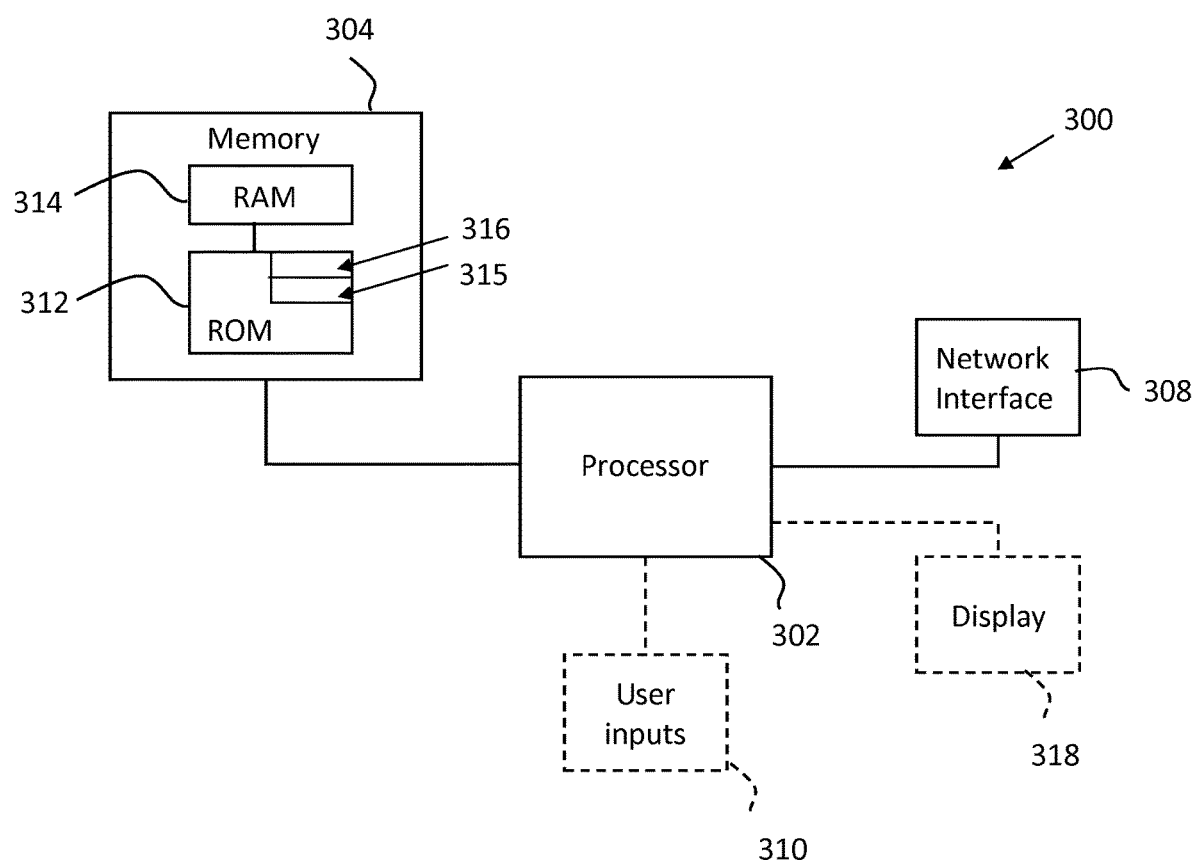
FIG. 11 is a block diagram of a system in accordance with an example embodiment.

For completeness, FIG. 11 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 60, 80 and 100 described above.

Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
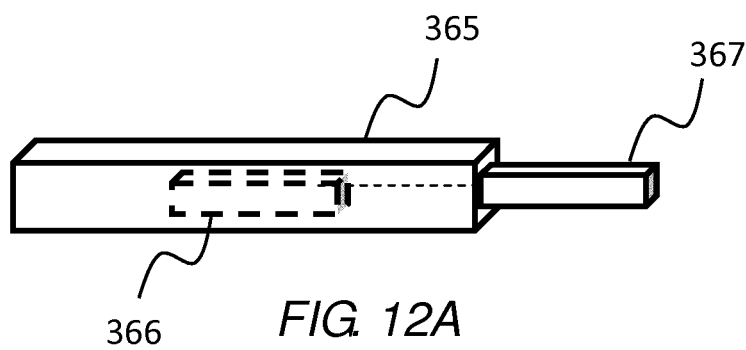
FIGS. 12A and 12B show tangible media, respectively a removable memory unit and a compact disc (CD) storing computer-readable code which when run by a computer perform operations according to example embodiments.
Figure 12B:
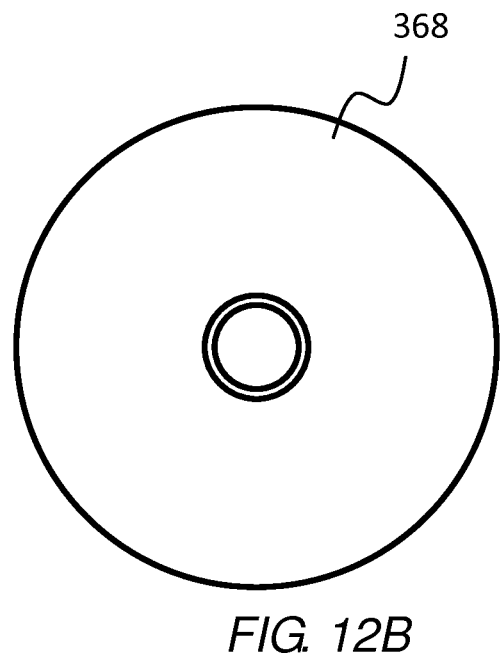

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 6, 8 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising
   at least one processor, and
   at least one non-transitory memory,
   wherein the at least one non-transitory memory is storing instructions that when executed by the at least one processor cause the apparatus to at least perform:
   obtaining information comprising a first beam alignment dataset, wherein the first beam alignment dataset comprises measurement data for a first plurality of beam pair transmissions,
   wherein each beam pair transmission of the first plurality of beam pair transmissions is between one of a plurality of communication beams of a first user device and one of a plurality of communication beams of a base station and
   wherein the first plurality of beam pair transmissions is a subset of all available beam pair transmissions between the first user device and the base station;
   wherein the information further comprises a second beam alignment dataset, wherein the second beam alignment dataset comprises alignment data for a most optimal at least one sub-beam pair transmission of a second plurality of beam pair transmissions; and
   based on the information, selecting a first beam pair combination for communications between the first user device and the base station, wherein the first beam pair combination comprises one of the plurality of beams of the first user device and one of the plurality of beams of the base station,
wherein selecting the first beam pair combination comprises a machine-learning model trained with the second beam alignment dataset.

2. The apparatus as claimed in claim 1, wherein the first beam pair combination is selected based on a determination of a deemed strongest communication channel between the first user device and the base station.

3. The apparatus as claimed in claim 1, wherein the second beam alignment dataset comprises measurement data for the second plurality of beam pair transmissions, wherein each beam pair transmission of the second plurality of beam pair transmissions is between one of the plurality of communication beams of the first user device and one of the plurality of communication beams of the base station.

4. The apparatus as claimed in claim 1, wherein the first plurality of beam pair transmissions is a subset of the second plurality of beam pair transmissions.

5. The apparatus as claimed in claim 4, wherein the first plurality of beam pair transmissions is a predefined subset of the second plurality of beam pair transmissions.

6. The apparatus as claimed in claim 3, wherein the second plurality of beam pair transmissions includes all available beam pair transmissions between the first user device and the base station.

7. The apparatus as claimed in claim 1, wherein: the first beam alignment dataset comprises a broad alignment dataset and a narrow alignment dataset; and selecting a first beam pair combination comprises selecting a broad beam pair combination and selecting a narrow beam pair combination, wherein: the broad alignment dataset comprises measurement data for a first plurality of broad beams and the narrow alignment dataset comprises measurement data for a first plurality of narrow beams from within a selected broad beam pair combination; and one or both of the broad and narrow alignment datasets are subsets of all available beam pair transmissions.

8. The apparatus as claimed in claim 1, further comprising determining the first plurality of beam pair transmissions and/or determining a set of possible beams from which the first plurality of beam pair transmissions are selectable.

9. The apparatus as claimed in claim 1, wherein selecting the first beam pair combination selects said first beam pair combination, at least in part, based on one or more previous first beam alignment datasets.

10. The apparatus as claimed in claim 1, wherein the at least one non-transitory memory is storing instructions that when executed by the at least one processor cause the apparatus to further perform:
determining a communication performance of at least one of the first beam pair combination or an accuracy of a machine learning module; and
re-training the machine learning module based on at least one of the communication performance or the accuracy being below a threshold performance.

11. The apparatus as claimed in claim 1, wherein: the first beam alignment dataset is obtained at least one of by the first user device sending a plurality of reference signals to the base station and/or or the base station sending a plurality of reference signals to the first user device; and the second beam alignment dataset is obtained at least one of by the first user device sending a plurality of reference signals to the base station or the base station sending a plurality of reference signals to the first user device.

12. A method comprising:
obtaining information comprising a first beam alignment dataset,
wherein the first beam alignment dataset comprises measurement data for a first plurality of beam pair transmissions,
wherein each beam pair transmission of the first plurality is between one of a plurality of communication beams of a first user device and one of a plurality of communication beams of a base station and
wherein the first plurality of beam pair transmissions is a subset of all available beam pair transmissions between the first user device and the base station;
wherein the information further comprises a second beam alignment dataset, wherein the second beam alignment dataset comprises alignment data for a most optimal at least one sub-beam pair transmission of a second plurality of beam pair transmissions; and
based on the information, selecting a first beam pair combination for communications between the first user device and the base station,
wherein the first beam pair combination comprises one of the plurality of beams of the first user device and one of the plurality of beams of the base station,
wherein selecting the first beam pair combination comprises a machine-learning model trained with the second beam alignment dataset.

13. A non-transitory computer readable medium comprising instructions, which when executed on an apparatus, cause the apparatus to perform at least the following:
obtain information comprising a first beam alignment dataset, wherein the first beam alignment dataset comprises measurement data for a first plurality of beam pair transmissions,
wherein each beam pair transmission of the first plurality is between one of a plurality of communication beams of a first user device and one of a plurality of communication beams of a base station and
wherein the first plurality of beam pair transmissions is a subset of all available beam pair transmissions between the first user device and the base station;
wherein the information further comprises a second beam alignment dataset, wherein the second beam alignment dataset comprises alignment data for a most optimal at least one sub-beam pair transmission of a second plurality of beam pair transmissions; and
based on the information, select a first beam pair combination for communications between the first user device and the base station, wherein the first beam pair combination comprises one of the plurality of beams of the first user device and one of the plurality of beams of the base station,
wherein selecting the first beam pair combination comprises a machine-learning model trained with the second beam alignment dataset.

* * * * *